United States Patent [19]

Valade

[11] 3,709,465
[45] Jan. 9, 1973

[54] LIFTING JACK
[75] Inventor: Victor D. Valade, Fraser, Mich.
[73] Assignee: General Motors Corporation, Detroit, Mich.
[22] Filed: July 27, 1971
[21] Appl. No.: 166,546

[52] U.S. Cl. ..................................................254/95
[51] Int. Cl. ............................................B66f 3/02
[58] Field of Search........254/111, 110, 109, 108, 95, 254/97

[56] References Cited

UNITED STATES PATENTS 1,338,682  5/1920  Dorman ..................................254/95
894,441    7/1908  Joyce ......................................254/95
2,630,297  3/1953  Hunz ......................................254/109

Primary Examiner—Othell M. Simpson
Assistant Examiner—Robert C. Watson
Attorney—Warren E. Finken et al.

[57] ABSTRACT

The lifting jack described herein incorporates a handle, a rack bar, a holding pawl for engaging the rack bar, coordinated linkage members, a wheel pawl and a toothed wheel functioning between the handle and the rack bar, a contoured spring interconnecting the pawls, and a manually-actuated selector lever for engaging or freeing the spring, the combination responding to the actuation of the handle to raise and lower an automobile in a highly efficient manner.

7 Claims, 13 Drawing Figures

PATENTED JAN 9 1973
3,709,465
SHEET 1 OF 2
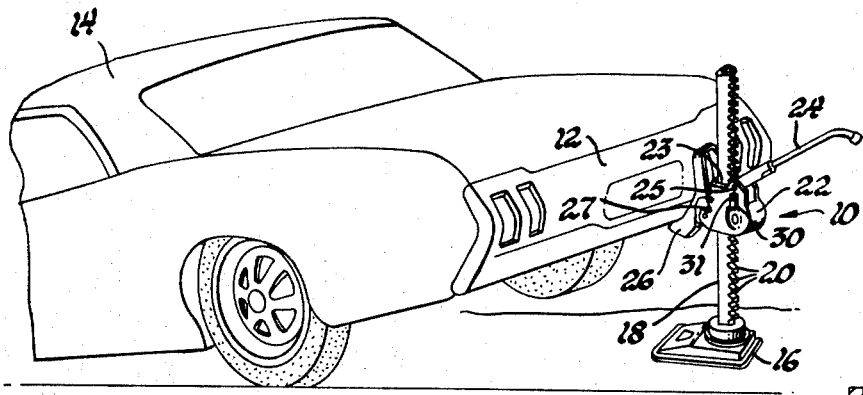
Fig.1
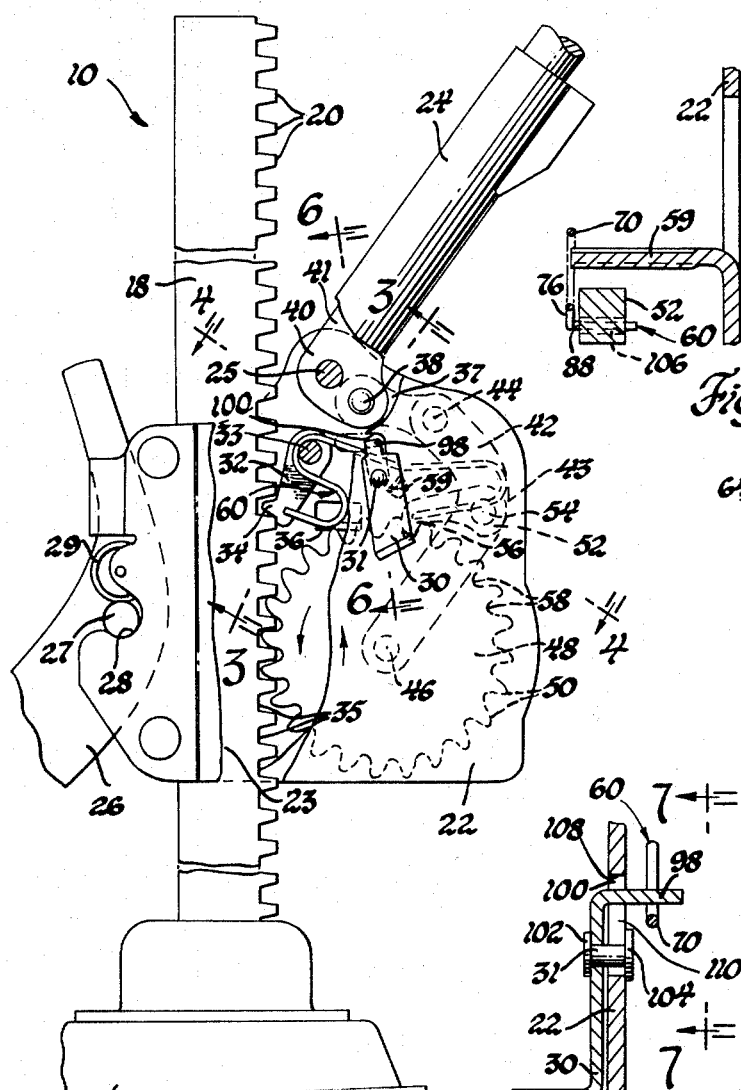
Fig.2
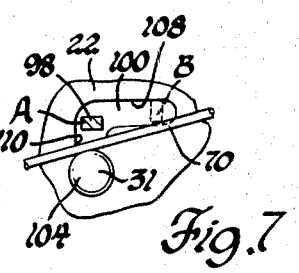
Fig.3
Fig.4
Fig.5
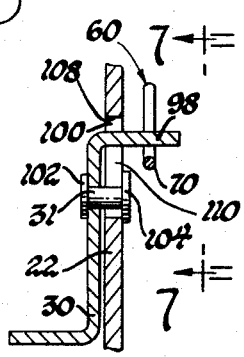
Fig.6
Fig.7
INVENTOR.
Victor D. Valade
BY
John P. Moran
ATTORNEY INVENTOR.
Victor D. Valade
BY
John P. Moran
ATTORNEY

1

LIFTING JACK

This invention relates generally to lifting jacks and, more particularly, to lifting jacks of a type suitable for use with automobiles or other vehicles.

The conventional automobile jack includes a rack bar, a handle, a pair of pawls engaging the rack bar, one for holding and one for lifting, with a spring interconnected therebetween and a selector lever for alternately manually contacting and withdrawing either from a midpoint on the spring or from one of the pawls for effectuating the raising and lowering of the automobile.

It is an object of the invention to provide an improved automobile jack which incorporates means for increasing the mechanical advantage therein, resulting in the raising and lowering of an automobile with a minimum of effort having to be exerted on the handle of the jack.

Another object of the invention is to provide an improved automobile jack employing a toothed wheel intermediate the rack bar and a driving or wheel pawl, the wheel pawl serving to cause the wheel to "walk" up or down the rack bar as required to cooperate with a holding pawl for raising and lowering an automobile.

A further object of the invention is to provide an improved automobile jack including a housing mounted around a toothed rack bar with a handle pivotally mounted on the housing, a pair of pivotally interconnected linkage members pivotally connected between a rotatable end of the handle and a toothed wheel whose teeth mesh with those on the rack bar. A contoured spring is connected at its ends respectively to a holding pawl which cooperates with the teeth on the rack bar, and to a wheel pawl which cooperates with the teeth of the wheel. A tab on the reversing lever either abuts against the spring to urge its ends and, hence, the two pawls in particular directions upon movement of the handle, or is released from the spring to cause its ends to reverse the directions of their forces and, consequently, the pawls in the opposite directions upon reverse movement of the handle.

These and other objects and advantages of the invention will become apparent when reference is made to the following description and accompanying drawings, wherein:

FIG. 1 is a fragmentary perspective view showing the application of a jack to an automobile;

FIG. 2 is a side view of an automobile jack embodying the invention;

Figure 8:
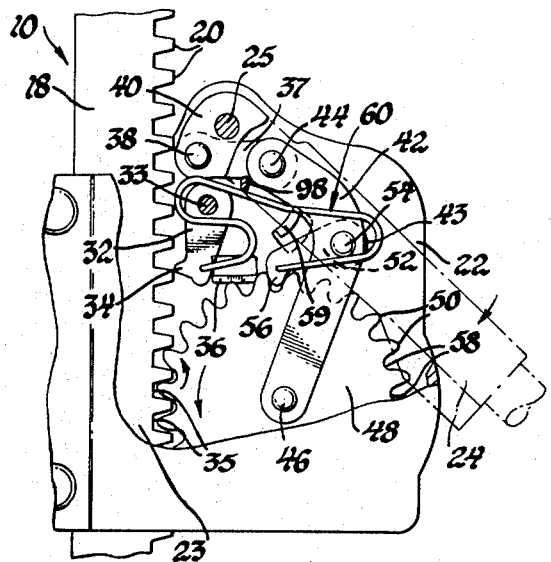
Figure 21:
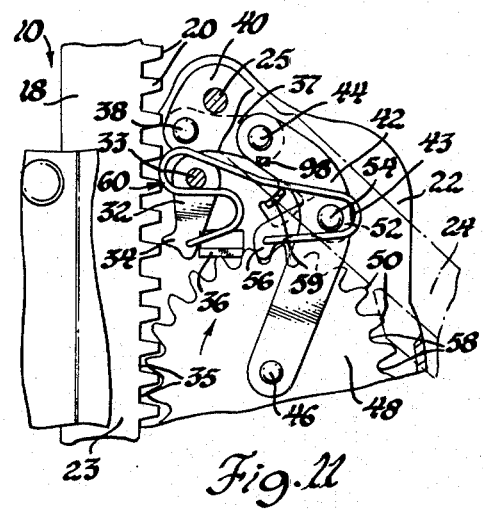
Figure 9:
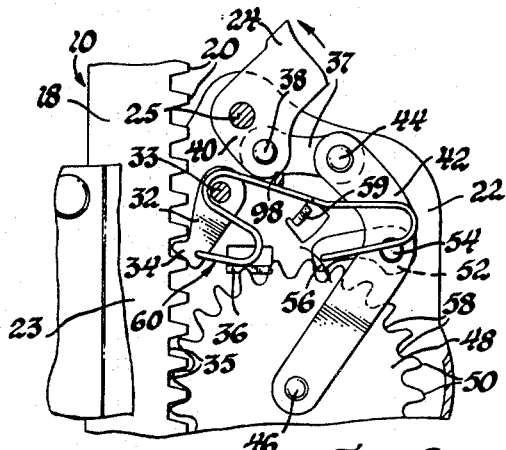
Figure 22:
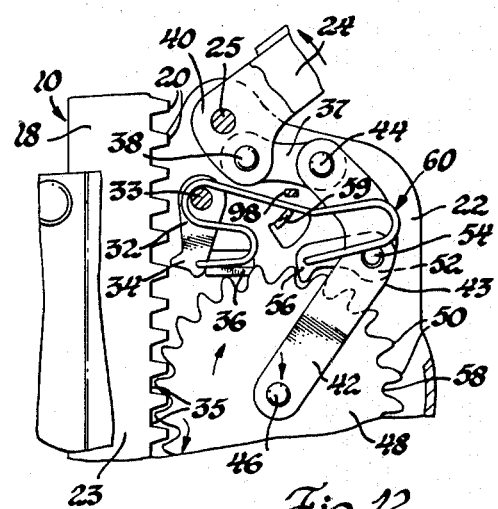
Figure 20:
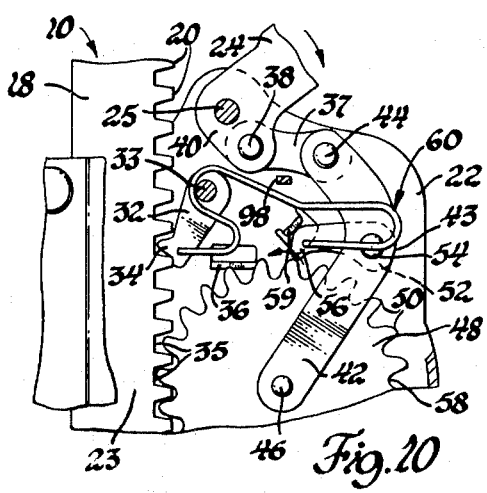
Figure 23:
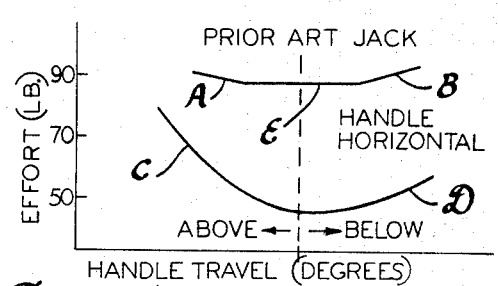

FIGS. 3, 4, and 6 are fragmentary cross-sectional views taken along the planes of the lines 3—3, 4—4, and 6—6, respectively, of FIG. 2, and looking in the direction of the arrows;

FIG. 5 is a perspective view of a portion of FIG. 2;

FIG. 7 is a fragmentary cross-sectional view taken along the plane of line 7—7 of FIG. 6, and looking in the direction of the arrows;

FIGS. 8–12 are fragmentary views illustrating various operative positions of the components of the FIG. 2 structure; and FIG. 13 is a graph illustrating an operational characteristic of the invention.

Referring now to the drawings in greater detail, FIG. 1 illustrates a lifting jack 10 for use on a conventional bumper 12 of an automobile 14. The jack 10 includes a stamped metal base 16 which supports an upright toothed rack bar 18 having a plurality of teeth 20 formed at spaced intervals thereon. A housing 22, having vertical opening 23 formed therethrough, is mounted around the toothed bar 18. A handle 24 is pivotally connected to one end thereof by a pivot pin 25 to the housing 22 on the toothed side of the bar 18, while a lifting member 26 is pivotally connected by a pivot pin 27 to the opposite side of the housing 22 for lifting contact with the bumper 12. The lifting member 26 is removable inasmuch as the pivot pin 27 is snapped into a notch 28 (FIG. 2) of the housing 22, and retained therein by a spring 29. A reversing or selector lever 30 is pivotally mounted on a pin 31 extending into the housing 22, as will be explained.

Referring now to FIGS. 2 and 3, it may be noted that the housing 22 includes a holding pawl 32 pivotally mounted at one end on a pivot pin 33 secured to the housing 22. A projection 34 is formed on the free end of the holding pawl 32 for cooperation with the notches or slots 35 formed on the rack bar 18 by adjacent teeth 20. A tab 36 is formed adjacent the holding pawl 32 by bending a portion of a side of the housing inwardly, for limiting the rightward movement of the holding pawl 32. A first substantially straight link 37 is pivotally connected to a pivot pin 38 mounted on the pivoted end 40 of the handle 24, the end 40 consisting of spaced-apart extensions 41 of the handle 24 straddling the link 37. A boomerang-shaped second link 42, having an arcuate intermediate portion 43, is pivotally connected at one end thereof to the free end of the first link 37 by means of a pivot pin 44, and at its other end to a pivot pin 46 extending through the center of a toothed wheel 48. The teeth 50 of the wheel 48 mesh with the slots 35 on the toothed rack bar 18.

A driving or wheel pawl 52 is pivotally connected at one end thereof by a pivot pin 54 to the intermediate arcuate portion 43 on the second link 42 and has a downwardly extending projection 56 formed on the other end thereof for cooperation with the notches or slots 58 formed between adjacent teeth 50 of the wheel 48. An arcuate tab 59 is formed adjacent the wheel pawl 52 by bending a portion of one side of the housing 22 inwardly, as illustrated in FIG. 4, to cam the wheel pawl 52 downward into the slots 58 of the wheel 48 as the wheel pawl 52 moves to the left in FIG. 2.

A contoured resilient member or spring 60 (FIG. 5) has arcuate sections 62, 64, and 66 formed thereon, with a straight section 68 interconnecting the arcuate sections 62 and 64, and straight sections 70 and 72 interconnected by an intermediate bend 74 extending between the arcuate sections 64 and 66. A straight section 76 extends from the arcuate section 66 substantially parallel to the straight section 72, while a short straight section 78 extends from the arcuate section 62 substantially parallel to the straight section 68. Further straight sections 80, 82, and 84 extend substantially at right angles from the straight sections 78, 80, and 82, respectively. A projection 86 is formed on the end of the straight section 84. A laterally extending straight section 88 extends substantially at a right angle from the straight section 76, substantially parallel to the laterally extending straight section 84.

It may be noted in FIG. 3 that the arcuate section 64 of the spring 60 is positioned around a spacer 90 mounted on the pivot pin 33 intermediate the housing 22 and one of a pair of oppositely disposed washers 92 and 94 adjacent the holding pawl 32, with the straight section 84 thereof extending through an opening 96 (FIG. 3) formed in the holding pawl 32. An inwardly extending tab or projection 98 (FIG. 6) formed on the reversing lever 30 extends through a right-angled opening 100 (FIG. 7) formed in the housing 22 and is positioned adjacent the upper side of the straight section 70 of the spring 60. The mounting pin 31 of the reversing lever 30 also extends through the opening 100, slidably retained therein by rivet heads 102 and 104 adjacent the lever 30 and the inner surface of the housing 22, respectively. The straight spring section 88 extends through an opening 106 (FIG. 4) formed in the driving pawl 52. As illustrated in FIG. 7, the opening 100 includes horizontal and vertical camming surfaces 108 and 110, respectively.

OPERATION

Raising the Vehicle

The reversing lever 30 (FIG. 2) is raised from the "A" position, FIG. 7, to the "B" position, the tab 98 being cammed along the surface 108 of the opening 100. In the "B" position, the tab 98 has its narrower edge in contact with the upper side of the straight spring section 70, causing the latter to be bowed downwardly.

Referring now to operational FIG. 8, as the handle 24 is lowered, the driving pawl 52 is moved leftwardly due to the resultant pivoting of the respective straight and boomerang-shaped interconnected linkage members 37 and 42 about the pivot pin 46. Leftward movement of the driving pawl 52 rotates the toothed wheel 48 in a counterclockwise direction causing the teeth 50 thereof to "walk up" the slots 35 of the rack bar 18, thereby raising the vehicle 14. Upward movement of the wheel 48 and housing 22 raises the holding pawl 32 upwardly, camming the projection 34 out of its particular slot 35 in the rack bar 18. The projection 34 is retained in contact with the next upper tooth 20 and urged into the next upper slot 35 by the straight section 84 of the spring 60, the latter exerting respective leftward and downward forces at the left and right ends thereof by virtue of its being bowed, as described above, at an intermediate point therealong by the tab 98 formed on the reversing lever 30.

Once the projection 34 of the holding pawl 32 enters the next upper slot 35 of the rack bar 18, it loads up for the raising of the handle 24. As the handle 24 is raised (FIG. 9), the now counterclockwise rotating pivot pin 38 on the end 40 of the handle 24 causes the arcuate-shaped link 42 to pivot in a clockwise direction about the pivot pin 46, causing the projection 56 of the wheel pawl 52 to be cammed out of its slot 58 in the toothed wheel 48, over the adjacent tooth 50, into the next right slot 58 (FIG. 9), as a result of being urged downwardly by the arcuate section 66 and the straight sections 76 and 88 of the spring 60. The wheel or driving pawl 52 is thus ready to rotate the wheel 48 another increment upon the next lowering stroke of the handle 24.

Lowering the Vehicle

The reversing lever 30 is manually actuated leftwardly from position "B" in FIG. 7, the pin 31 being cammed downwardly along the surface 110 of the opening 100, causing the tab 98 of of the lever 30 to be moved away from the upper surface of the straight section 70 of the spring 60 to position "A" of FIG. 7 and as illustrated in FIG. 10. This reverses the forces exerted by the respective straight end sections 84 and 88 of the spring 60, by virtue of the spring 60 no longer being restrained at the straight section 70 thereof, the forces at the ends now being generally rightwardly for the arcuate spring section 62 and the straight section 84, and upwardly for the straight sections 76 and 88.

With the handle 24 in its uppermost position, the load is acting through the holding pawl 32 and the spring 60 has pulled the driving pawl 52 from its slots 58 in the wheel 48. As the handle 24 is lowered, the clockwise rotation of the pivot pin 38 on the end 40 of the handle 24 rotates the respective straight and arcuate-shaped interconnected linkages 37 and 42 in a counterclockwise direction. This action moves the wheel pawl 52 leftwardly (FIG. 10) until the projection end of the pawl 52 abuts against and is projected downwardly by the underside of the curved tab 59 into the next left slot 58 (FIG. 10). At the bottom of the stroke of the handle 24 (FIG. 11), the projection 56 of the wheel pawl 52 loads up in the right-hand side of the slot 58 of the toothed wheel 48, while the projection 34 of the holding pawl 32 is pulled out of its particular slot 35 by the above-mentioned generally rightward force of the straight end section 84 of the spring 60. The wheel 48 is thus in condition to be rotated in a clockwise direction by the projection 56 and the projection 34 is free to proceed toward the next lower slot 35 along the rack bar 18.

As the handle 24 is once again moved upwardly (FIG. 12), the toothed wheel 48 is caused to rotate in a clockwise direction, its teeth 50 "walking down" the notches 35 of the rack bar 18, lowering the vehicle 14, the load thereof being felt at the end of the lever arm of the handle 24, with the projection 56 of the wheel pawl 52 being held in position in the notch 58 by the load of the vehicle. Rightward pivoting movement of the pawl 32 will be stopped by the abutment thereof against the fixed stop 36.

As the handle 24 approaches its uppermost position, the toothed wheel 48 and the housing 22, as well as the pawl 32, will have rotated downwardly such that the projection 34 of the holding pawl 32 is adjacent the next lower slot 35 of the rack bar 18. The next initial downward motion of the handle 24 causes the spring 60 to act as a driving link, i.e., as soon as the handle 24 starts downwardly and the driving pawl 52 starts moving leftwardly, the entire spring 60 moves leftwardly, causing the straight spring end section 88 to once again urge the projection 34 of the holding pawl 32 into the next adjacent lower slot 35 of the rack bar 18. This, of course, transfers the load from the driving pawl 52 to the holding pawl 32, ready for the next transfer of the projection 56 of the pawl 52 to the next left slot 58 of the wheel 48.

It should be apparent that there is virtually no lost motion of the handle 24 between successive strokes thereof, either at the top or bottom portions of each stroke by virtue of the immediate interplay between the projections of the pawls 32 and 52 on the respective notches 35 and 58 of the rack bar 18 and the toothed wheel 48, depending upon the position of the tab 98 of the selector lever 30 relative to the spring 60.

It should also be realized that, as a result of the leverage advantage of the shaped linkage member 42, the position of the pivot 54 on the link 42, and the distance between the pivots 25 and 38, substantially less manual effort is required on the handle 24, in order to cause the wheel 48 to walk up or down the rack bar 18, than is the case for conventional lift pawl and handle arrangement. In the latter, the lift pawl is limited with respect to how close its pivot can be located relative to the pivot point of the handle and still have sufficient metal therebetween to support the load to be lifted by the action of the lift pawl on the rack. Furthermore, the latter arrangement incorporates a so-called "lost motion" movement at the top and bottom of each stroke of the handle, represented generally by curve segments "A" and "B" of FIG. 13, in order for the respective lift and hold pawls to alternately mesh with and release from the rack bar. The advantage of the applicant's improved jack 10 is represented generally by the respective downwardly and upwardly extending effort-vs-travel curve segments "C" and "D," FIG. 13, the effort varying between, say, 45 and 80 pounds, as compared to the substantially level approximately 90-pound effort curve "E" for a typical prior art jack.

While but one embodiment of the invention has been shown and described, other modifications thereof are possible.

I claim:

1. For use with a vehicle, a lifting jack comprising a vertical rack bar, a housing slidably mounted thereon, a lifting member pivotally mounted on said housing for engaging said vehicle during raising and lowering thereof, a handle, a pivot for pivotally mounting said handle on said housing, a holding pawl pivotally mounted on said housing and operative to engage said rack bar to at times support the weight of said vehicle, a toothed wheel member in mesh with said rack bar and operative to rotate upwardly and downwardly thereon to raise and lower said vehicle, linkage means pivotally mounted on an end portion of said handle apart from said pivot and extending to the axis of said toothed wheel member, a driving pawl pivotally connected to said linkage means and operative to engage said toothed wheel member to cause said wheel member to rotate to move along said rack bar in response to manual movement of said handle, spring means operatively connected at the respective ends thereof to said driving and holding pawls, and selector means for tensioning said spring means to cause said spring means to urge said driving and holding pawls toward said rack bar and said wheel member, respectively.

2. For use with a vehicle, a lifting jack comprising a vertical rack bar, a housing slidable therealong, a lifting member pivotally mounted on said housing for engaging said vehicle during raising and lowering thereof, a handle pivotally mounted on said housing, a holding pawl pivotally mounted on said housing and operative to engage said rack bar to at times support the weight of said vehicle, a toothed wheel member in mesh with said rack bar and operative to rotate upwardly and downwardly thereon to raise and lower said vehicle, linkage means between an end portion of said handle adjacent the pivotal mounting thereof and the axis of said toothed wheel member, a driving pawl pivotally connected to said linkage means and operative to engage said toothed wheel member to cause said wheel member to rotate to move along said rack bar in response to manual movement of said handle, spring means operatively connected at the respective ends thereof to said driving and holding pawls, and selector means for tensioning said spring means to cause said spring means to urge said driving and holding pawls toward said rack bar and said wheel member, respectively, to raise said vehicle upon lowering said handle, and for untensioning said spring means to permit said spring means to urge said driving and holding pawls away from said rack bar and said wheel member, respectively, to lower said vehicle upon raising said handle.

3. For use with a vehicle, a lifting jack comprising a vertical rack bar, a housing slidable therealong, a lifting member pivotally mounted on said housing for engaging said vehicle during raising and lowering thereof, a handle pivotally mounted on said housing, a holding pawl pivotally mounted on said housing and operative to engage said rack bar to at times support the weight of said vehicle, a toothed wheel member in mesh with said rack bar and operative to rotate upwardly and downwardly thereon to raise and lower said vehicle, a first straight linkage member pivotally connected at one end thereof to an end portion of said handle, a second linkage member having an intermediate bend portion formed thereon pivotally connected between the other end of said first linkage member and the axis of said toothed wheel member, a driving pawl pivotally connected to said second linkage member and operative to engage said toothed wheel member to cause said wheel member to rotate to move along said rack bar in response to manual movement of said handle, a contoured spring member operatively connected at the respective ends thereof to said driving and holding pawls, and selector means for alternately tensioning and untensioning said spring member to cause said spring member to alternately urge said driving and holding pawls toward and away from said rack bar and said wheel member, respectively.

4. For use with a vehicle, a lifting jack comprising a vertical rack bar, a housing slidable therealong, a lifting member pivotally mounted on said housing for engaging said vehicle during raising and lowering thereof, a handle pivotally mounted on said housing, a holding pawl pivotally mounted on said housing and operative to engage said rack bar to at times support the weight of said vehicle, a toothed wheel member in mesh with said rack bar and operative to rotate upwardly and downwardly thereon to raise and lower said vehicle, first and second linkage members pivotally connected between a pivotable end portion of said handle and the axis of said toothed wheel member, a driving pawl pivotally connected to said second linkage member and operative to engage said toothed wheel member to cause said wheel member to rotate to move along said rack bar in response to manual movement of said handle, spring means operatively connected at the respective ends thereof to said driving and holding pawls, selector means for alternately tensioning and untensioning said spring means to cause said spring means to alternately urge said driving and holding pawls toward and away from said rack bar and said wheel member, respectively, and a fixed abutment member for at times directing said driving pawl into mesh with said wheel member.

5. A lifting jack comprising a base, a vertically disposed rack bar having teeth and intermittent notches formed therealong and mounted in said base, a housing slidable along said rack bar, a handle pivotally connected to said housing, a lifting member pivotally connected to said housing, a holding pawl pivotally connected to said housing and operable to engage said notches of said rack bar, a wheel having teeth and intermittent notches formed around the outer periphery thereof, said teeth meshing with said notches of said rack bar below said holding pawl, a first linkage member pivotally mounted on said handle apart from the pivotal connection of said handle on said housing, a second linkage member pivotally interconnecting said wheel and said first linkage member, a driving pawl pivotally connected to an intermediate point of said second linkage member and operable to engage said notches of said wheel, a contoured spring resiliently interconnecting said driving and holding pawls, a selector tab for alternate engagement and disengagement with an intermediate point of said contoured spring, and first and second fixed abutments for at times being contacted by said driving and holding pawls, respectively.

6. The lifting jack described in claim 5, wherein said first linkage member is straight and said second linkage member includes a bend portion intermediate the ends thereof, with said driving pawl being pivotally mounted at said bend portion.

7. For use with a vehicle, a lifting jack comprising a base, a vertically disposed rack bar having teeth and intermittent notches formed therealong and mounted in said base, a housing slidable along said rack bar, a handle pivotally connected to said housing, a lifting member pivotally connected to said housing, a holding pawl pivotally connected to said housing and operable to engage said notches of said rack bar, a wheel having teeth and intermittent notches formed around the outer periphery thereof, said teeth on said wheel meshing with said notches of said rack bar below said holding pawl, a straight linkage member pivotally mounted on said handle apart from the pivotal connection of said handle on said housing, a bent linkage member pivotally interconnecting said wheel and said straight linkage member, a driving pawl pivotally connected to an intermediate portion of said bent linkage member and operable to engage said notches of said wheel, a contoured spring resiliently interconnecting said driving and holding pawls, a selector tab movable into engagement with an intermediate portion of said contoured spring for urging said holding pawl into engagement with the adjacent notch of said rack bar and for urging said driving pawl into engagement with the adjacent notch of said wheel, and movable out of engagement with said contoured spring, means freeing said spring to urge said holding and driving pawls away from said teeth of said rack bar and wheel, respectively, and a fixed tab for urging said driving pawl into engagement with said adjacent tooth of said wheel while said selector tab is out of engagement with said spring upon downward movement of said handle, said downward movement of said handle simultaneously moving said spring to move said holding pawl back into engagement with said rack bar while said spring selector tab is out of engagement with said spring.

* * * * *